Figure 1:
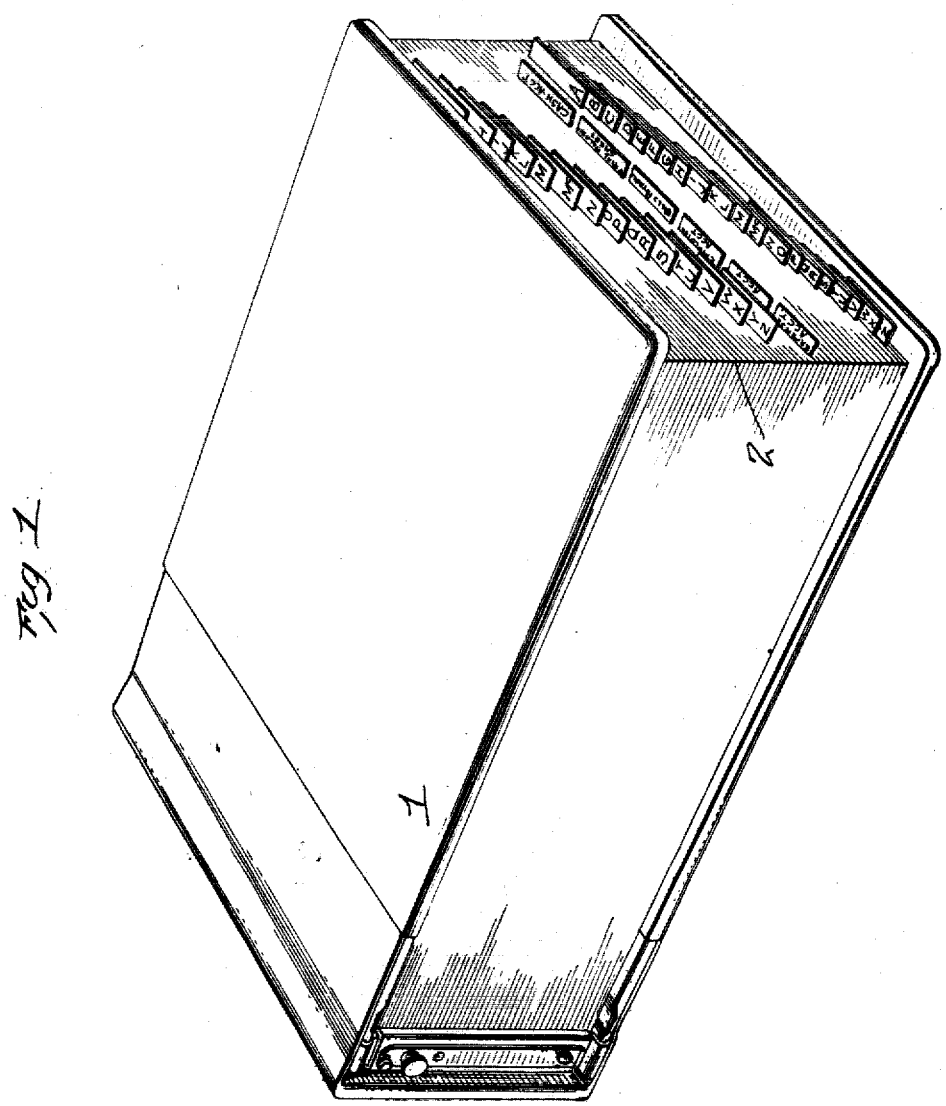

No. 815,259. PATENTED MAR. 13, 1906.
F. W. BRIGGS.
EXTENDED LEDGER SYSTEM.
APPLICATION FILED JULY 8, 1904.

17 SHEETS—SHEET 1.

No. 815,259. PATENTED MAR. 13, 1906.
F. W. BRIGGS.
EXTENDED LEDGER SYSTEM.
APPLICATION FILED JULY 8, 1904.

17 SHEETS—SHEET 2.

ATTEST:
C. S. Middleton
A. M. Tanner

INVENTOR
FRANCIS W. BRIGGS.
By Spear Middleton, Donaldson & Spear
Attys.

No. 815,259. PATENTED MAR. 13, 1906.
F. W. BRIGGS.
EXTENDED LEDGER SYSTEM.
APPLICATION FILED JULY 8, 1904.

17 SHEETS—SHEET 3.

No. 815,259. PATENTED MAR. 13, 1906.
F. W. BRIGGS.
EXTENDED LEDGER SYSTEM.
APPLICATION FILED JULY 8, 1904.
17 SHEETS—SHEET 4.
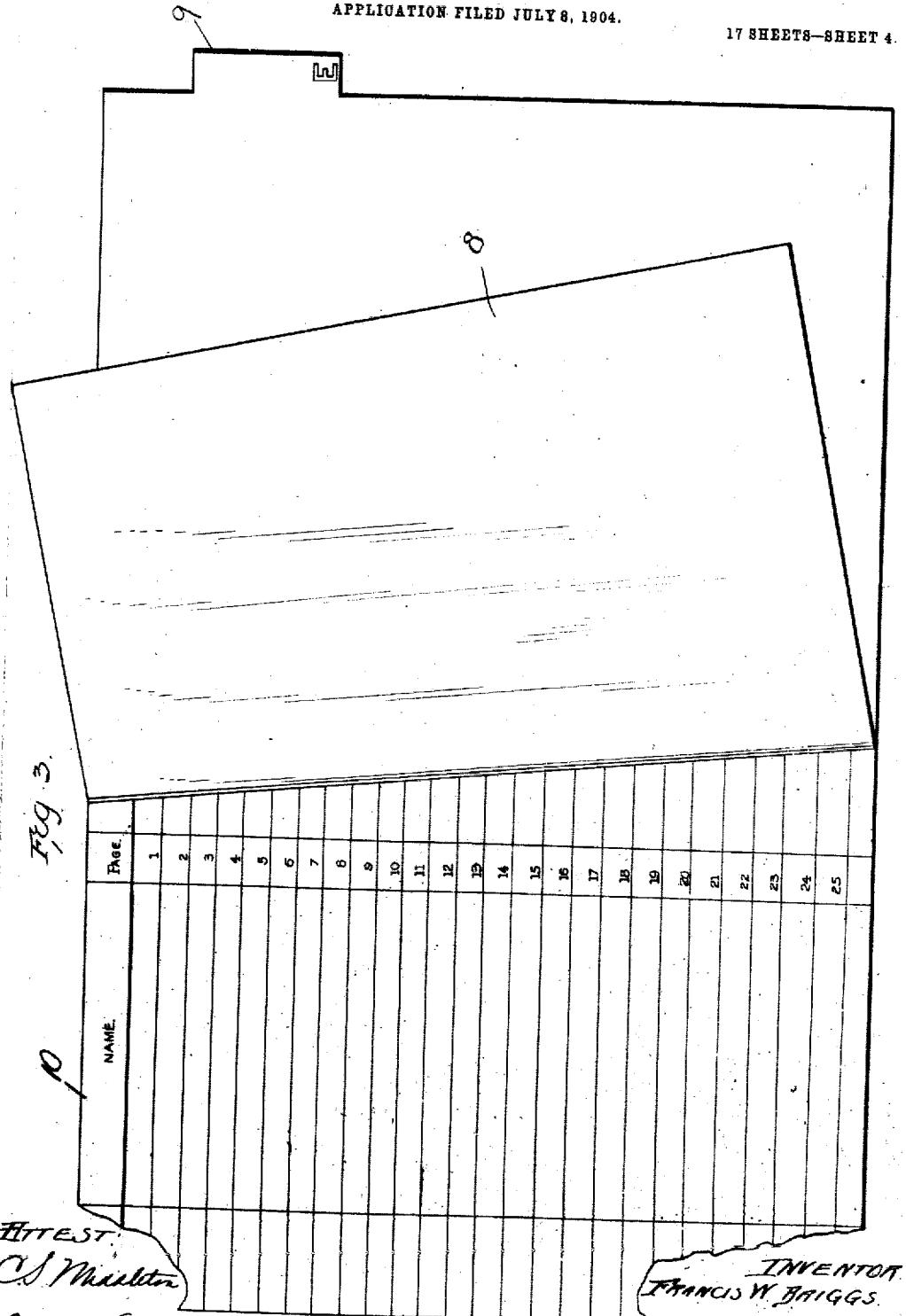

No. 815,259. PATENTED MAR. 13, 1906.
F. W. BRIGGS.
EXTENDED LEDGER SYSTEM.
APPLICATION FILED JULY 8, 1904.

17 SHEETS—SHEET 5.

Fig. 4

No. 815,259.  
F. W. BRIGGS.  
EXTENDED LEDGER SYSTEM.  
APPLICATION FILED JULY 8, 1904.

PATENTED MAR. 13, 1906.  
17 SHEETS—SHEET 6.

*Fig. 5.*

BILLS RECEIVABLE.

ATTEST:

INVENTOR.
FRANCIS W. BRIGGS.

No. 815,259. PATENTED MAR. 13, 1906.
F. W. BRIGGS.
EXTENDED LEDGER SYSTEM.
APPLICATION FILED JULY 8, 1904.

17 SHEETS—SHEET 7.

Fig. 6.

ATTEST:
C. S. Middleton
A. M. Tanner

INVENTOR.
FRANCIS W. BRIGGS.

By Spear, Middleton, Donaldson & Spear
Att'ys.

No. 815,259. PATENTED MAR. 13, 1906.
F. W. BRIGGS.
EXTENDED LEDGER SYSTEM.
APPLICATION FILED JULY 8, 1904.

17 SHEETS—SHEET 8.

Fig. 7

Bills Receivable—Labor Sheet
JANUARY | FEBRUARY | MARCH | APRIL | MAY | JUNE

ATTEST:
C. S. Middleton
A. M. Tanner

INVENTOR
FRANCIS W. BRIGGS.
Dr Spear, Middleton, Donaldson & Spear
Att'y.

No. 815,259. PATENTED MAR. 13, 1906.
F. W. BRIGGS.
EXTENDED LEDGER SYSTEM.
APPLICATION FILED JULY 8, 1904.
17 SHEETS—SHEET 9.

Trial Balance Sheet.

| | JANUARY | | | FEBRUARY |
|---|---|---|---|---|
| | Total Amount | Dr or Cr | Balance on Hand | |
| Stock on hand | 5500000 | | | |
| New goods purchased | 1722500 | | | |
| Total amount of goods | 7222500 | | 5612547 | |
| Total amount of goods sold, etc. | 1709953 | % 20 | | |
| (entry) | 3419.90 | | 341900 | |
| Total balance due | 2441966 | | 5854537 | |
| Total balance to be paid | 635000 | Dr | | |
| Cash paid on account | 700070 | | 5900034 | |
| Cash Sales | 1014917 | | 5464503 | |
| Cash made on discounts | 15100 | | | |
| Cash on hand | 603757 | | | |
| Total amount of cash | 2333074 | | 972674 | |
| Total cash paid out | 1361200 | | 6437177 | |
| Take out stock on hand last month | 5500000 | | | |
| Amount balance due us last month | 100000 | | | |
| Take out cash on hand last month | 250000 | | 5890000 | |
| (entry) | 5850000 | Cr | 516177 | |

Fig. 8.

ATTEST.
C. S. Middleton
A. M. Tanner

INVENTOR.
FRANCIS W. BRIGGS.
By Spear, Middleton, Donaldson & Spear
Attys.

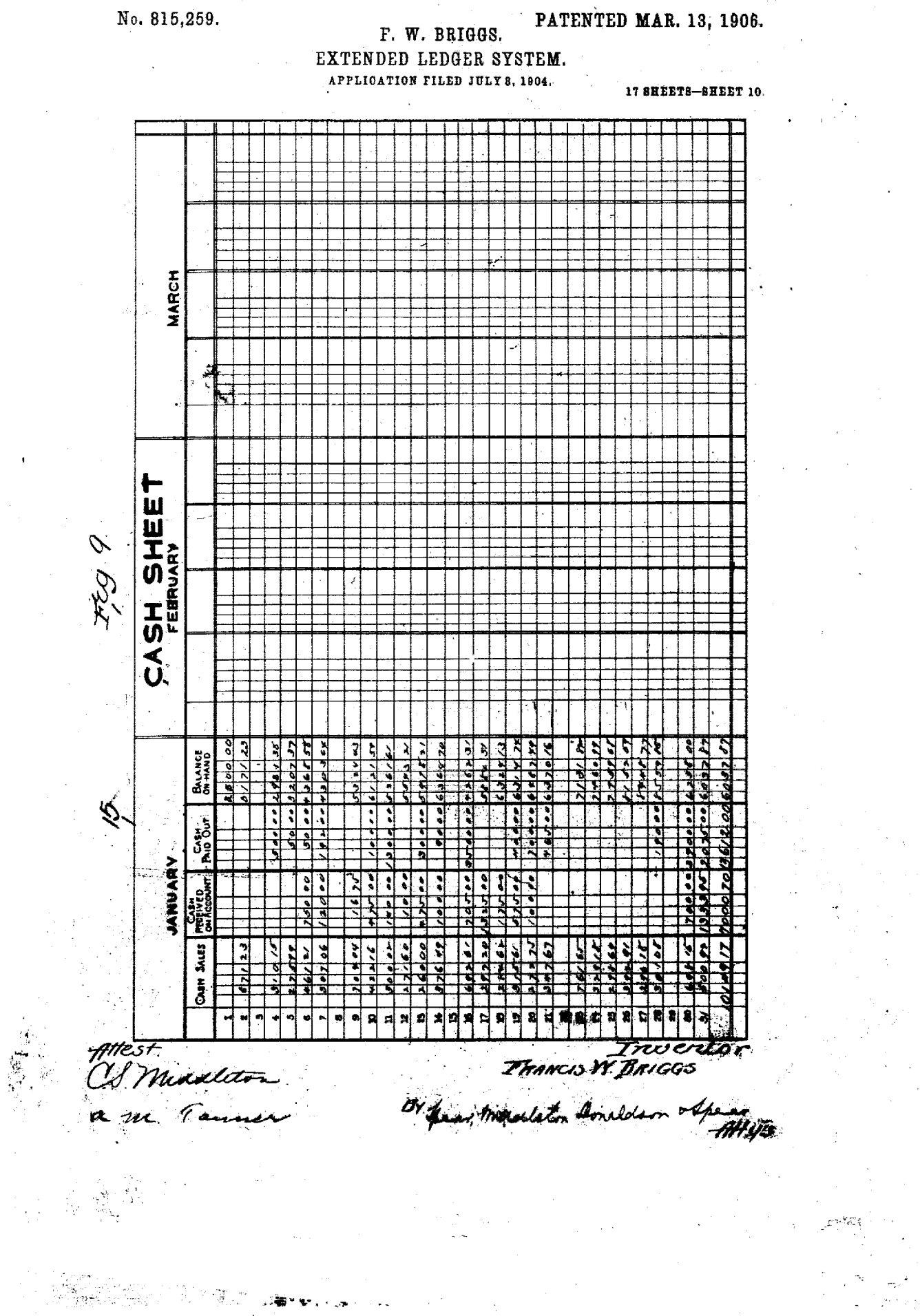

No. 815,259. PATENTED MAR. 13, 1906.
F. W. BRIGGS.
EXTENDED LEDGER SYSTEM.
APPLICATION FILED JULY 8, 1904.

17 SHEETS—SHEET 10.

Fig. 9

Attest.
C. S. Middleton
A. M. Tanner

Inventor
Francis W. Briggs
By Spear, Middleton, Donaldson & Spear
Attys

No. 815,259. PATENTED MAR. 13, 1906.
F. W. BRIGGS.
EXTENDED LEDGER SYSTEM.
APPLICATION FILED JULY 8, 1904.

17 SHEETS—SHEET 11.

*Fig. 10.*

ATTEST:
C. S. Middleton.
A. M. Tanner.

INVENTOR.
FRANCIS W. BRIGGS.
By Spear, Middleton, Donaldson & Spear
Attys.

No. 815,259. PATENTED MAR. 13, 1906.
F. W. BRIGGS.
EXTENDED LEDGER SYSTEM.
APPLICATION FILED JULY 8, 1904.

17 SHEETS—SHEET 12.

Fig. 11.

ATTEST:
C. S. Middleton
A. M. Tanner

INVENTOR.
FRANCIS W. BRIGGS.
By Spear, Middleton, Donaldson & Spear
Attys.

No. 815,259. PATENTED MAR. 13, 1906.
F. W. BRIGGS.
EXTENDED LEDGER SYSTEM.
APPLICATION FILED JULY 6, 1904.

17 SHEETS—SHEET 13.

*Fig. 12.*

EXPENSE ACCOUNT

ATTEST:
C. S. Middleton
A. M. Tanner

INVENTOR
FRANCIS W. BRIGGS.

Figure 13:
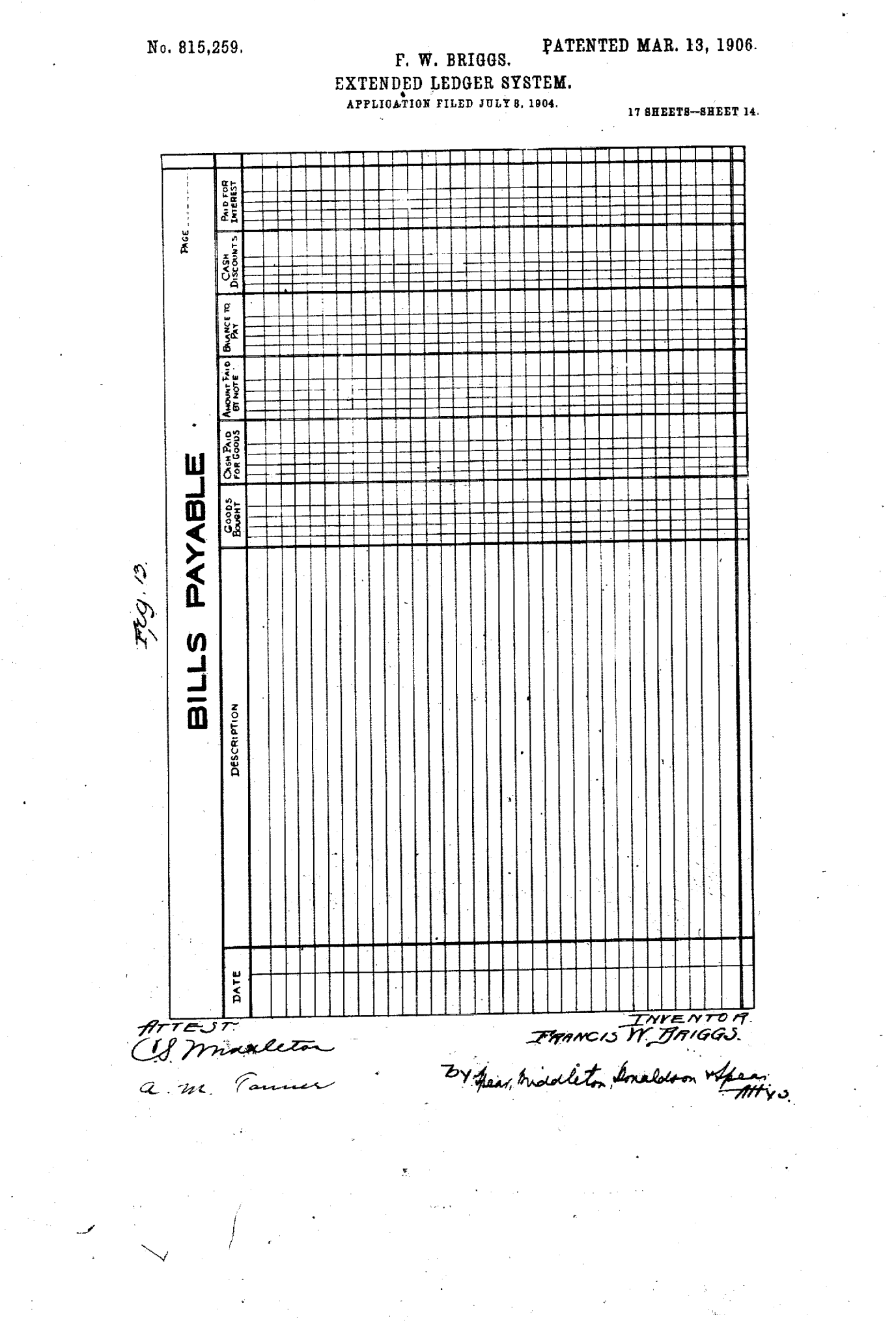

Fig. 13. BILLS PAYABLE

No. 815,259. PATENTED MAR. 13, 1906.
F. W. BRIGGS.
EXTENDED LEDGER SYSTEM.
APPLICATION FILED JULY 8, 1904.

17 SHEETS—SHEET 15.

Fig. 14.

BILLS PAYABLE

ATTEST:
C. S. Middleton
A. M. Tanner

INVENTOR.
Francis W. Briggs.

By Spear, Middleton, Donaldson & Spear
Att'ys

No. 815,269.

F. W. BRIGGS.
EXTENDED LEDGER SYSTEM.
APPLICATION FILED JULY 8, 1904.

PATENTED MAR. 13, 1906.

17 SHEETS—SHEET 16.

Fig. 15.

No. 815,259.
F. W. BRIGGS.
EXTENDED LEDGER SYSTEM.
APPLICATION FILED JULY 8, 1904.

PATENTED MAR. 13, 1906.

17 SHEETS—SHEET 17.

Fig. 16.

INVENTOR
FRANCIS W. BRIGGS.
By Spear, Middleton, Donaldson & Spear
Att'ys

ATTEST:
C. S. Middleton
A. M. Tanner

UNITED STATES PATENT OFFICE.

FRANCIS W. BRIGGS, OF LEWISTON, MAINE.

EXTENDED LEDGER SYSTEM.

No. 815,259.

Specification of Letters Patent.

Patented March 13, 1906.

Application filed July 8, 1904. Serial No. 215,806.

*To all whom it may concern:*

Be it known that I, FRANCIS W. BRIGGS, a citizen of the United States, residing at Lewiston, Maine, have invented certain new and useful Improvements in Extended Ledger Systems, of which the following is a specification.

My invention herein set forth relates to the structure of the account-book, as hereinafter described and claimed, and involves a new system of bookkeeping designed for greater simplicity, for the more ready and certain exhibition of the business transactions, the condition of each customer's account, his items and balances, as well as the condition of the business, the bills due and payable, and the balances, and generally whatever concerns the owners of the business. The construction of the book when used with a temporary binder also makes easy the removal and insertion of sheets and renders the book a perpetual one.

A leading feature of my invention consists in grouping the accounts of customers under initial-name letters, in which grouping the individual accounts of persons under the same name-initial, together with an index therefor, and a monthly statement of summaries or results of the individual transactions with reference to the individual accounts are included in one group, the total number of groups including all the initial-name letters or the total business to which the book relates, and in this also provision is made for the constant showing of balances as well as the nature and extent and state of each customer's business.

My invention also includes special construction and arrangement of lines, columns, and spaces of sheets, all as hereinafter set forth. These are illustrated in the accompanying drawings, in which—

Figure 1 is a perspective view of the assembled sheets held in a temporary binder. Fig. 2 is a view of a ledger-stub and bill-head sheet, the sheet being folded up slightly to illustrate the blank sheet beneath the same. Fig. 2ª is a view of a ledger-sheet used with the sheet shown in Fig. 1ª—that is, a sheet that is used for the account of customers who do not care for an itemized statement at the end of the month. Fig. 3 is a view showing the division-sheet carrying the index-tab and also the numerical index-sheets, a sufficient portion of each sheet being shown to fully illustrate the same. Fig. 4 is a view of the ledger-sheet to which the totals from all the ledger-stubs of each section are carried. Fig. 5 is a view of the total ledger-sheet to which all the totals of the ledger-sheets of all the sections are carried. Fig. 6 is a view of the sheet holding the balance in merchandise totals for the entire business for each month of the year. Fig. 7 is a view of the labor-sheet. Fig. 8 is a view of the trial-balance sheet. Fig. 9 is a view of the cash-account sheet. Fig. 10 is a view of the employee's account-sheet. Fig. 11 is a view of the personal-account sheet. Fig. 12 is a view of the expense-account sheet. Fig. 13 is a view of the account-sheets for bills payable. Fig. 14 is a view of the total ledger-sheet to which the totals to all the bills-payable sheets of each section are carried. Fig. 15 is a view of the alphabetical total-sheet to which the totals from all the sheets 14 are carried, and Fig. 16 is a view of the sheet to which all the totals from all the preceding bills-payable sheets are carried.

In the drawings I have indicated by the numeral 1 a temporary binder, in which are contained the loose sheets 2, which go to make up my improved ledger system. I have shown as a matter of convenience a ledger of a size adapted to keep thirty accounts under each letter; but it will be understood by using a larger binder and set of leaves the number of accounts may be increased as desired.

Under "Bills receivable" each group contains a series of individual-account sheets, each of which consists of a leaf or page 3, Fig. 2, having a vertical weakened line dividing it into two parts 4 and 5, the first of these, 4, being printed as a bill-head and being designed to be detached and sent or delivered to the party with whom the account is opened. It contains the usual items and debit and credit columns, as indicated by the letters "Dr." and "Cr" and columns which are indicated by the words "Paid for labor" and "Balance." The ledger-stub (indicated by the numeral 5) contains at the top blank lines for the purchaser's name, the date of opening the account, the time of rendering the accounts or statements, closing the account, and the carrying forward of a balance, as clearly indicated. Below this space are a plurality of vertical lines forming columns on the ledger-stub proper, these columns being respectively for the date, the day-book page or check-number, the number of salesman, the total amount of the sale, credits by cash and by note, and balance due. Back of each page or leaf thus ruled it will be seen that there is a blank sheet 6, between which and the ruled portion 4 is placed a carbon-sheet, so that a carbon copy will be made of the bill 4, thus keeping a complete record after the bill has been detached. It will be seen from the sheet thus described that the balance-column will always show the balance of the customer's last-month's account and also the final balance due and that the customer's bill is always ready to be delivered to the customer whether or not the bookkeeper is present, as all that is necessary to be done when a customer asks for his bill is to transfer to the balance-column of the part or section 4 the last amount in the balance-column of the section 5, detach the section 4, and hand it to the customer. By providing the amount-of-sale column I am enabled to check any mistakes made in posting items from the sales-book to the itemized bill, which forms a part of the ledger-stub.

Some customers retain their sales-checks and do not care to have an itemized statement of account sent them, and to provide for these I use a certain number of sheets or pages, as indicated in Fig. 2ª. This sheet is ruled in two parts, which are duplicates of each other and both of which are detachable, providing two bills for each sheet, as the full width of the sheet is not needed for a bill of this character. Each section is provided with the same columns as the ledger-stub, having in addition a narrow goods-column. In using this it will be understood that only the total of each sales-check is entered on the sheet, and when it is sent to the customer the latter refers to his sales-checks, which he has kept if he wishes to see the separate items for the amount of any one date. A blank sheet is used under this with a manifold sheet similar to the sheet of Fig. 2 to keep the record. I provide as many of these pages or sheets as the size of the business warrants, thirty being described as a convenient number, and between the pages at intervals I mount sheets of heavy linen or shade-cloth, (indicated at 8, Fig. 3,) which have on their edges projecting tabs 9, one for each letter of the alphabet, whereby all names under each letter are grouped together and may be readily turned to. Adjoining each sheet 8 is an index-sheet 10, which is provided with a vertical column for containing the names of the customers within that group and a column for numbers, which numbers include the individual accounts.

It will be seen that by making the index-sheet which carries the alphabetical tab independent of the sheet which carries the names of the customers I avoid the expense of buying a new set of letters when the customers have changed and of the trouble of transferring their names, as only one sheet at a time is necessary to be changed.

For each letter of the alphabet and preferably in proximity to the index-sheet I provide a requisite number of ledger-sheets 11, Fig. 4, which contain sets of vertical columns for each month of the year and sub-columns in each set headed "Amount rendered," "Amount cash paid," "Amount paid by note," and "Balance due," as indicated. The numbers in a vertical row at the left hand of each subset from 1 to 30 indicate the page of the section, so that this page or sheet will show the full amount of the account rendered, the amount paid by cash and by note, and the full amount of the balance due from any one of the thirty customers for every month of the year, and of course it is only necessary to turn to the index-sheet to the corresponding number thereon to ascertain the customer owing any particular amount on the ledger-sheet, and, vice versa, from the number on the index-sheet direct reference can be made to the ledger-sheet for the items referred to. The total at the foot of the columns of this ledger-sheet will be the total of all the customers whose names begin with the same letter of the alphabet, and these four totals may then be carried forward to the sheet containing columns arranged in the same way by months, but with the twenty-six letters of the alphabet arranged vertically at the side, as shown by the sheet marked 12. (See Fig. 5.) Thus it will be seen that from this sheet I can tell at a glance the total of the amount rendered, cash paid, amount paid by note, and balance due from all the customers whose names begin with any one letter of the alphabet for each month of the year, and the totals at the foot of these columns will give the totals for all the purchasers, thus saving the work of going over a great many pages under ordinary ledger systems. These totals can then be carried forward to the balance and merchandise sheet 13, Fig. 6, which has columns for the amount rendered, total cash paid, total paid by note, total balance due, and total cash-sales for each month in the year. From the figures of these columns in order to get the amount rendered the last month's balance can be subtracted from the total amount rendered. If to the total balance due the total cash paid on account be added and the last month's balance be subtracted from this amount the result will be the merchandise sold during the month on credit. If the cash results be added, the result is the total amount of merchandise sold. This is clearly indicated by printed matter on the said merchandise-sheet.

Many business houses or concerns receive more or less money for labor performed, and I therefore provide for each section a labor-sheet 14, Fig. 7, ruled in vertical columns for the months of the year and having the numerals from "1" to "30" down the left-hand margin of each column to indicate the number of the page of the section and the customer against whom the charge for labor is made. The total at the foot of each of these columns will give the total amount paid for labor for each month, and this amount will be added to the previous balance and the total used as a balance in taking the merchandise account.

The columns for amount paid by note and the provision of means for keeping a record of amounts paid for labor are important features.

In the ledger-stub the provision of a column for items paid by note saves the trouble of going to another book to find what balance is due by note, for where customers pay by note it is necessary to treat that amount as unsettled in one way and as settled by note in another way, for when a merchant takes a customer's note in payment for goods or settlement of account he naturally indorses the note and gets it discounted at the bank. I provide a column "Cash-discounts," Fig. 13, in "Bills payable" to connect with the note-column in ledger-stub in "Bills receivable," which shows the full amount of money paid out for discount. On the other hand, if the customer fails to pay the note when due the merchant is obliged to charge up the note once again with discount and interest as a balance due. By providing a column "Paid by note" for notes on the ledger-sheet shown in Fig. 2 and similar columns in the sheet of Figs. 4 and 5, condensing all the outstanding paper, I secure a correct statement of all unpaid notes.

The connection or coöperation of the "Paid-for-labor" column on section 4 of the sheet shown in Fig. 2 with the sheet 14 (shown in Fig. 7) is of extreme importance, as a merchant cannot take a correct merchandise account without the "Paid-for-labor" column without going to all the trouble of going over each stub separate and picking out all payments received for labor, and more than one-half of the payments in some businesses is for labor. So in order to get a correct statement of merchandise account of goods sold I enter all amounts received for labor in "Paid-for-labor" column on the bill-sheets and then condense it on the labor-sheet and treat the full amount received for labor as last month's balance by adding it to the last month's balance due and then substract the result from the amount rendered, and in that way I have a correct account.

The sheets for the cash account are indicated by the numeral 15, having each four columns for cash sales, cash received on account, cash paid out, and balance on hand for each day of the month. The results received from the columns before described may be carried to the trial-balance sheet, (indicated at 15',) which contains columns for each month in the year and from which the merchant can see at a glance just how he stands for each month of the year as to profit and loss and stock on hand.

The foregoing relates mainly to the bills or accounts receivable. In addition to this I provide in the same ledger a section of groups for bills payable, having an index system and initial-letter grouping exactly like that described in connection with the bills receivable. Under each letter of the alphabet I provide a plurality of ledger-pages ruled for date, description of purchase, amount of goods bought, cash paid for goods, amount paid by note, amount to be paid, cash-discounts, and amount paid for interest. (See Fig. 13.) The footings from these columns are carried over to the ledger-sheets, Fig. 14, at the back of each section, which will show in the six vertical columns for each month corresponding to the six narrow columns of the ledger-page the full amount of business transacted with all the firms of that section, there being a numbered line corresponding to each page of the section similar to those shown in Fig. 4. The footings of these columns are then carried to the sheet, Fig. 15, having corresponding columns for each month with the letters of the alphabet in a vertical row at the margin. The sheet shown in Fig. 15 is similar to that shown in Fig. 5, so that each line receives the totals of all the accounts of all parties whose names begin with the corresponding initial letter in the same manner as described hereinbefore in connection with accounts receivable. The totals of these columns give the total amount of business for the month for all the accounts, and the results may be further condensed on the sheet shown in Fig. 16, according to the instructions of these columns, as in bills or accounts receivable. In addition to the foregoing I find it desirable to include in the same ledger an employee's account, as indicated at 16, Fig. 10, a personal account, as indicated at 17, and a monthly-expense account, as indicated at 18.

The trial-balance sheets (shown in Fig. 8) contain sets of columns for every month in the year and are designed to receive the totals from the summary sheets of both the bills-receivable and bills-payable accounts. The set of columns for each month is arranged as follows: Two sets of vertical figure-columns are designated, respectively, "Total amount" and "Balance on hand." A descriptive column on the left is crossed by horizontal lines, all of which extend through the first figure-column and part of which extend through the second.

In the spaces formed by the horizontal lines in the descriptive column are written in succession the following: "Stock on hand;" "New goods purchased;" "Total amount of goods;" "Total amount of goods sold your mdse. account;" "Take the percentage you reckon for profit of amount sold, add to balance of stock, and your have your stock on hand;" "Total balance due;" "Total balance to be paid;" "Cash paid in on account;" "Cash sales;" "Cash made on discounts;" "Cash on hand;" "Total amount of cash;" "Total cash paid out;" "Take out stock on hand last month;" "Take out balance due us last month;" "Take out cash on hand last month;" "Subtract total from balance on hand; result gives profit or loss."

The items called for by the various terms are taken from the various summary sheets, and by adding or subtracting according to the directions the trial-balance is struck.

I claim—

1. In a ledger, a series of groups, each group appropriated to an initial letter and comprising a series of sheets, each one of which sheets is specially designated to an individual in said initial-letter group, and has its special numeral, and appropriately-designated spaces for individual account; and a sheet or series of sheets having appropriately-designated monthly columns and numbered lines for all the individual accounts in the same name-initial, and referring to said individual accounts, substantially as described.

2. In a ledger, a series of groups, each group appropriated to an initial letter and comprising a series of sheets, each one of which sheets is specially designated to an individual in said initial-letter group and has its special page-numeral and appropriately-designated spaces for individual accounts; and a sheet or series of sheets having appropriately-designated monthly columns and numbered lines corresponding to all the individual accounts in the same initial, and referring to said individual accounts, the said individual and monthly sheets including an appropriately-designated column for the balance due, substantially as described.

3. In a ledger, a series of groups, each group appropriated to an initial letter and comprising a series of sheets, each one of which series is specially designated to an individual in said initial-letter group, and has its special numeral and appropriately-designated spaces for individual account; and a sheet or series of sheets having monthly columns and numbered lines for all the individual accounts in the same name-initial, and referring to said individual accounts, the said individual and monthly sheets including an appropriately-designated column for the balance due, each of said groups also including an index-sheet having an appropriately-designated column for the names under the same initial letter and an appropriately-designated column for the number of every one of said names, said number referring to said names and accounts in each of the sheets of the group herein specified.

4. In a ledger, a group of sheets for a plurality of individuals having the same initial letter, an index-sheet provided with a column of reference-numbers to the sheets included in said group and appropriated to the individuals under said initial; each of the sheets in said group having its appropriate number, designated for an individual in said initial-letter group, and being divided by a weakened line and appropriately ruled to form an itemized bill and retained stub parts with appropriately-designated columns for items of sale, credits and balance, the said parts hereinbefore specified in this claim being in further combination with a sheet or series of sheets having columns and numbered lines said columns being designated for each month of the year, each of said columns and numbered lines affording spaces which are designated for the results of each individual account provided for in the stubs hereinbefore referred to, including the balance due; all of the said elements herein forming a group, substantially as described.

5. In a ledger a series of groups, each group being appropriated to a plurality of individuals having the same name-initial and comprising a series of appropriately ruled and designated stubs and adjacent bill-forms separated therefrom by a weakened line, said bill-forms each having an individual number, each of said stubs and bill-forms being specially designated to an individual in said initial-letter group, an index referring to numbers of individual stub and bill sheets, a sheet or sheets having appropriately-designated columns for all the months of the year to receive the combined items from the individual bill and stub sheets, and having numbered lines, and division-leaves separating the groups, and a sheet or sheets appropriate to the entire series of groups and having appropriately-designated monthly columns and alphabetically-lettered horizontal lines for receiving the amounts and balances for the series of groups, substantially as described.

6. In a ledger system, a series of groups of sheets, each group appropriated to an initial letter and comprising a series of sheets, each one of which is specially designated to an individual in said initial-letter group, and has its special numeral and appropriately-designated spaces for individual account, a sheet or sheets associated with each group having appropriately-designated monthly columns and numbered horizontal lines for all the individual accounts in the same name-initial, a sheet or sheets appropriated to the entire series of groups and having appropriately-designated monthly columns and alphabetically-lettered horizontal lines, and a summary sheet or sheets appropriated to the entire series of groups.

In testimony whereof I affix my signature in presence of two witnesses.

FRANCIS W. BRIGGS.

Witnesses:
E. M. BRIGGS,
H. C. PARSONS.